United States Patent
Kato et al.

(10) Patent No.: US 12,429,728 B2
(45) Date of Patent: Sep. 30, 2025

(54) DISPLAY DEVICE

(71) Applicant: Japan Display Inc., Tokyo (JP)

(72) Inventors: Takayuki Kato, Tokyo (JP); Shinichiro Tanaka, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/820,635

(22) Filed: Aug. 30, 2024

(65) Prior Publication Data

US 2025/0085588 A1 Mar. 13, 2025

(30) Foreign Application Priority Data

Sep. 12, 2023 (JP) ................. 2023-147256

(51) Int. Cl.
*G02F 1/1335* (2006.01)

(52) U.S. Cl.
CPC .... *G02F 1/133562* (2021.01); *G02F 2202/28* (2013.01)

(58) Field of Classification Search
CPC .............................................. G02F 1/133562
USPC .......................................................... 349/57
See application file for complete search history.

(56) References Cited

U.S. PATENT DOCUMENTS

2008/0049165 A1* 2/2008 Min ................... G02B 3/0043
349/64
2022/0390798 A1* 12/2022 Isshiki ............. G02F 1/133502

FOREIGN PATENT DOCUMENTS

JP 2003107442 A * 4/2003
JP 2007-264529 A 10/2007

* cited by examiner

*Primary Examiner* — Christopher M Raabe
(74) *Attorney, Agent, or Firm* — Maier & Maier, PLLC

(57) ABSTRACT

According to one embodiment, a display device includes an illumination device, a display panel, an optical sheet, a prism sheet, and an adhesive. The display panel includes a first substrate opposed to the illumination device and a second substrate opposed to the first substrate. The optical sheet is bonded to the second substrate. The prism sheet includes a first surface, which is a flat surface opposed to an upper surface of the optical sheet, and a second surface, which includes a plurality of prisms provided in parallel with each other, and which is located on a side opposite to the first surface. The adhesive bonds the upper surface of the optical sheet and the first surface together.

15 Claims, 11 Drawing Sheets

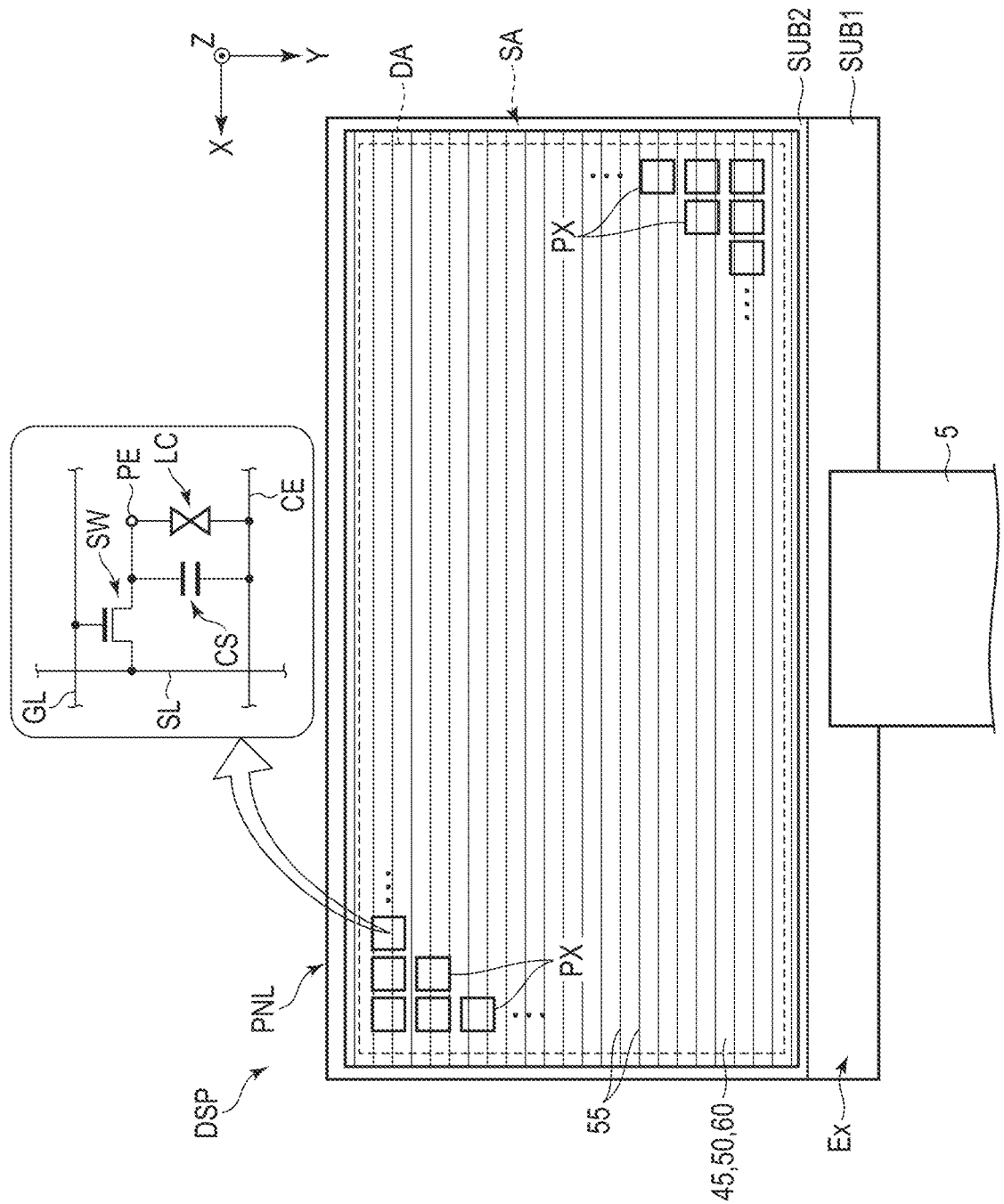
F I G. 4

DISPLAY DEVICE

CROSS-REFERENCE TO RELATED APPLICATIONS

This application is based upon and claims the benefit of priority from Japanese Patent Application No. 2023-147256, filed Sep. 12, 2023, the entire contents of which are incorporated herein by reference.

FIELD

Embodiments described herein relate generally to a display device.

BACKGROUND

As an example of a display device, a head-up display, which projects images on a projection surface of a windshield and the like to make virtual images visually recognizable for a user, is known. As an example, the display device includes an illumination device, a display panel transmitting light emitted from the illumination device to project images, and a prism sheet refracting light that has passed through the display panel. Reduction in the manufacturing cost is required in such a display device.

BRIEF DESCRIPTION OF THE DRAWINGS

FIG. 4 is a schematic plan view of the display device of the first embodiment.

DETAILED DESCRIPTION

Figure 1:
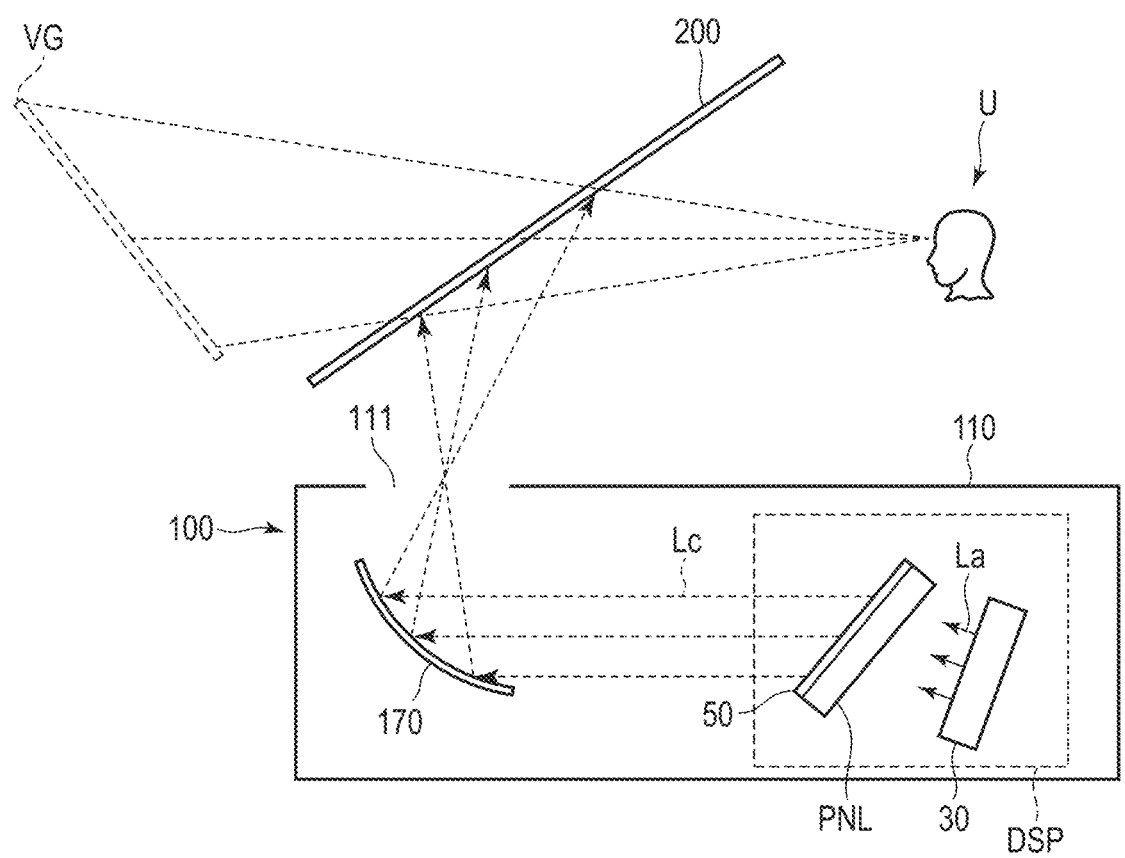
FIG. 1 is a view showing an application example of a display device of a present embodiment.

In general, according to one embodiment, a display device includes an illumination device, a display panel, an optical sheet, a prism sheet, and an adhesive. The display panel includes a first substrate opposed to the illumination device, a second substrate opposed to the first substrate, and a liquid crystal layer provided between the first substrate and the second substrate. The optical sheet is bonded to the second substrate. The prism sheet includes a first surface, which is a flat surface opposed to an upper surface of the optical sheet, and a second surface, which includes a plurality of prisms provided in parallel with each other, and which is located on a side opposite to the first surface. The adhesive bonds the upper surface of the optical sheet and the first surface together.

In one embodiment, a display device includes an illumination device, a display panel, an optical sheet, a prism sheet, and an adhesive. The display panel includes a first substrate opposed to the illumination device, a second substrate opposed to the first substrate, a liquid crystal layer provided between the first substrate and the second substrate, a display area displaying an image, and a surrounding area surrounding the display area. The optical sheet is bonded to the second substrate. The prism sheet includes a first surface, which is a flat surface, and a second surface, which is located on a side opposite to the first surface, is opposed to an upper surface of the optical sheet, and includes a plurality of prisms provided in parallel with each other. The adhesive bonds the upper surface of the optical sheet and the second surface together in the surrounding area. A top portion of the prism is spaced apart from the upper surface of the optical sheet.

The present embodiment can provide a display device such that the manufacturing cost thereof can be reduced.

Embodiments will be described with reference to the accompanying drawings.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. In addition, in the specification and drawings, structural elements which function in the same or a similar manner to those described in connection with preceding drawings are denoted by like reference numbers, detailed description thereof being omitted unless necessary.

In the figures, an X-axis, a Y-axis and a Z-axis orthogonal to each other are described to facilitate understanding as needed. A direction parallel to the X-axis is referred to as a first direction X. A direction parallel to the Y-axis is referred to as a second direction Y. A direction parallel to the Z-axis is referred to as a third direction Z. A plan view is defined as appearance when various types of elements are viewed parallel to the third direction Z.

FIG. 1 is a view showing an application example of a display device DSP of the present embodiment. The display device DSP is mounted on, for example, a head-up display 100, which uses a front shield of vehicles and the like as a projection surface (screen) 200. The projection surface 200 is not limited to the front shield itself, but may be other combiners.

The head-up display 100 comprises the display device DSP, a housing 110, and an optical member 170. The display device DSP comprises an illumination device 30, a display panel PNL, and a prism sheet 50. The display panel PNL is provided between the illumination device 30 and the prism sheet 50. The prism sheet 50 is provided between the display panel PNL and the optical member 170. The optical member 170 is provided in an optical path between the display device DSP and the projection surface 200. The optical member 170 includes, for example, a concave mirror. The optical member 170 may include a reflective mirror and a lens. The housing 110 is formed in, for example, a box shape that accommodates the display device DSP and the optical member 170.

The illumination device 30 includes, for example, a light emitting element such as a light emitting diode (LED) and a light guide. Light La emitted from the illumination device 30 enters the display PNL. A part of the light La that has entered the display panel PNL passes through the display panel PNL and is refracted on the prism sheet 50. The display panel PNL is configured to display an image by selectively transmitting the light La. Light Lc refracted on the prism sheet 50 is emitted toward the optical member 170. The optical member 170 projects the light Lc on the projection surface 200 through an aperture 111 provided in the housing 110. This configuration allows a user U, who uses the head-up display 100, to visually recognize a virtual image VG in front of the projection surface 200.

First Embodiment

Figure 2:
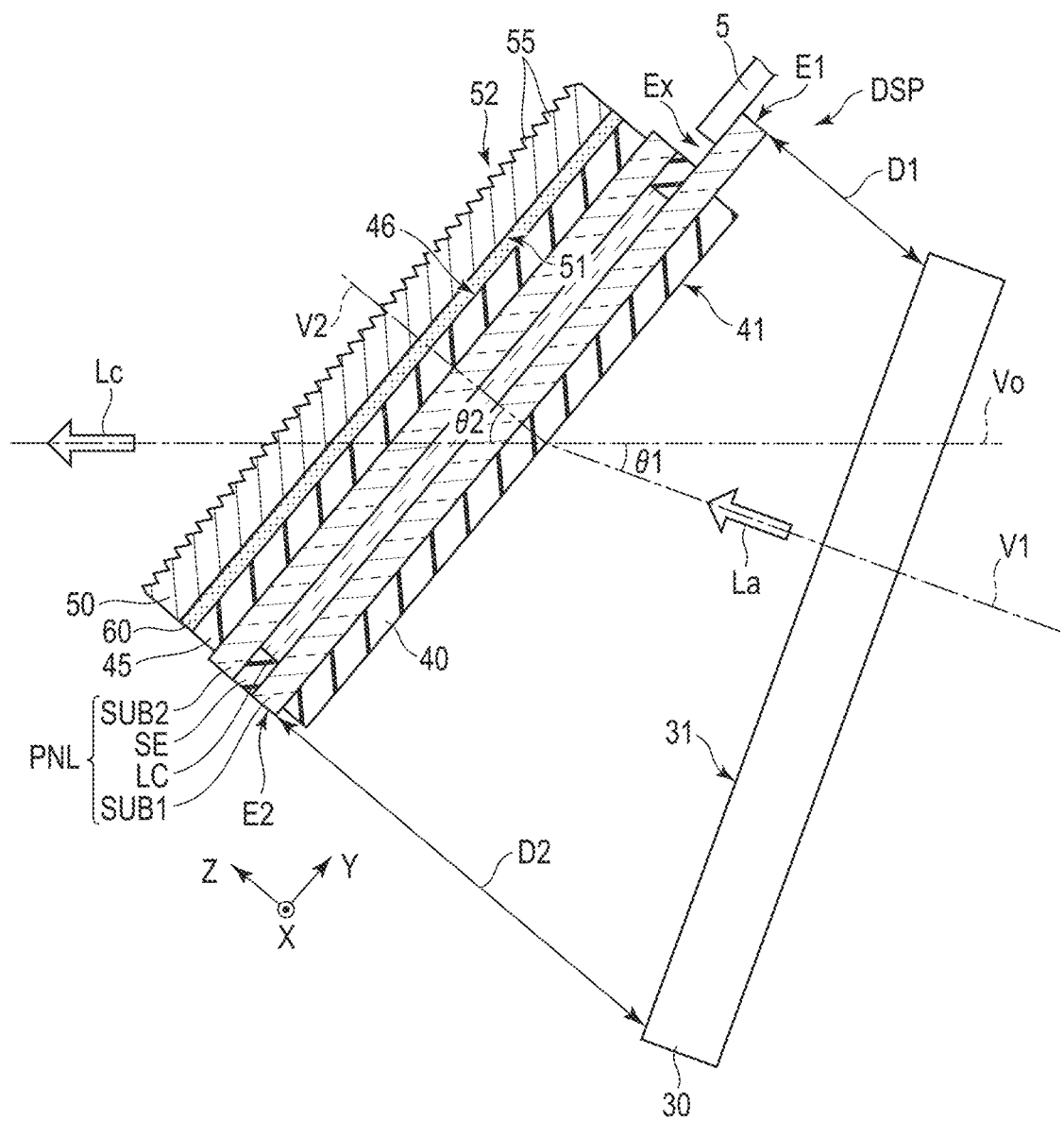
FIG. 2 is a view showing a schematic configuration example of a display device of a first embodiment.

FIG. 2 is a view showing a schematic configuration example of a display device DSP of a first embodiment.

In this specification, the first direction X and the second direction Y correspond to the directions parallel to a main surface of a substrate which constitutes the display device DSP, and the third direction Z corresponds to the thickness direction of the display device DSP. FIG. 2 is a schematic cross-section of the display device DSP in a Y-Z plane defined by the second direction Y and the third direction Z.

The display device DSP comprises optical sheets 40 and 45, an adhesive 60, and a wiring board 5, in addition to the illumination device 30, the display panel PNL, and the prism sheet 50.

The illumination device 30 includes an emission surface 31, which emits light. The emission surface 31 is orthogonal to an axis V1 inclined with respect to an output axis Vo at angle θ1. The output axis Vo is an axis parallel to a direction in which the light Lc refracted on the prism sheet 50 travels. In the example of FIG. 2, the angle θ1 is an acute angle. The light La emitted from the emission surface 31 travels along the axis V1.

The display panel PNL comprises a first substrate SUB1, a second substrate SUB2, a liquid crystal layer LC, and a seal SE. Each of the first substrate SUB1 and the second substrate SUB2 is formed in a flat plate shape parallel to the X-Y plane defined by the first direction X and the second direction Y. The second substrate SUB2 is opposed to the first substrate SUB1 in the third direction Z. The first substrate SUB1 and the second substrate SUB2 are bonded together by the seal SE. The liquid crystal layer LC is provided between the first substrate SUB1 and the second substrate SUB2 and is sealed by the seal SE.

The wiring board 5 is mounted on an extending portion Ex, which is a part that does not overlap with the second substrate SUB2, of the first substrate SUB1. The wiring board 5 is, for example, a flexible printed circuit which can be bent. An IC chip and the like may be mounted on the extending portion Ex, in addition to the wiring board 5.

The optical sheet 40 is bonded to a lower surface of the first substrate SUB1. The optical sheet 40 includes a lower surface 41 located on a side opposite to a surface bonded to the first substrate SUB1. The lower surface 41 is a surface entered by light La emitted from the illumination device 30.

The optical sheet 45 is bonded to an upper surface of the second substrate SUB2. The optical sheet 45 includes an upper surface 46 located on a side opposite to a surface bonded to the second substrate SUB2. The upper surface 46 emits light that has passed through the optical sheet 40, the display panel PNL, and the optical sheet 45.

Each of the lower surface 41 and the upper surface 46 is orthogonal to an axis V2 inclined with respect to the output axis Vo at angle θ2. The axis V2 is parallel to the third direction Z. In the example of FIG. 2, the angle θ2 is an acute angle. Further, in the example of FIG. 2, the angle θ2 is greater than the angle θ1. The angle θ2 may be the same angle as the angle θ1 ($0°<θ1≤θ2<90°$).

The optical sheets 40 and 45 are polarizers that include polarization axes orthogonal to each other, for example, on the X-Y plane. The optical sheets 40 and 45 may include other optical members such as a retardation film, in addition to the polarizer.

The prism sheet 50 includes a first surface 51 and a second surface 52 provided on a side opposite to the first surface 51. The first surface 51 is a flat surface opposed to the upper surface 46 of the optical sheet 45. In other words, the first surface 51 is orthogonal to the axis V2. The second surface 52 includes a plurality of prisms 55 provided in parallel with each other in the second direction Y. Details of the plurality of prisms 55 will be described later. The adhesive 60 is transparent and bonds the upper surface 46 and the first surface 51 together. The adhesive 60 covers the entire first surface 51. The adhesive 60 is formed of, for example, a material that has the same refractive index as the prism sheet 50. For example, an optical clear adhesive (OCA) and an optical clearer resin (OCR) can be used for the material of the adhesive 60.

The emission surface 31 of the illumination device 30 is inclined with respect to the first substrate SUB1. In the first substrate SUB1, an end portion of one end side (the tip side of the arrow indicating the second direction Y) along the second direction Y (direction in which the plurality of prisms 55 are provided) is referred to as a first end portion E1, and the end portion opposite to the first end portion E1 is referred to as a second end portion E2. A gap D1 between the first substrate SUB1 and the illumination device 30 on the first end portion E1 side is smaller than a gap D2 between the first substrate SUB1 and the illumination device 30 on the second end portion E2 side. However, when the angle θ1 and the angle θ2 are the same, the gap D1 and the gap D2 are the same (D1≤D2). These gaps D1 and D2 are distances along the third direction Z.

The light La emitted from the emission surface 31 of the illumination device 30 enters the lower surface 41 of the optical sheet 40. A part of the light that has entered the lower surface 41 passes through the optical sheet 40, the display panel PNL, the optical sheet 45, and the adhesive 60 and enters the first surface 51 of the prism sheet 50. The light that has entered the first surface 51 is refracted by the plurality of prisms 55 and is emitted as light Lc along the output axis Vo. The light Lc emitted from the prism sheet 50 travels toward the optical member 170 shown in FIG. 1.

Figure 3:
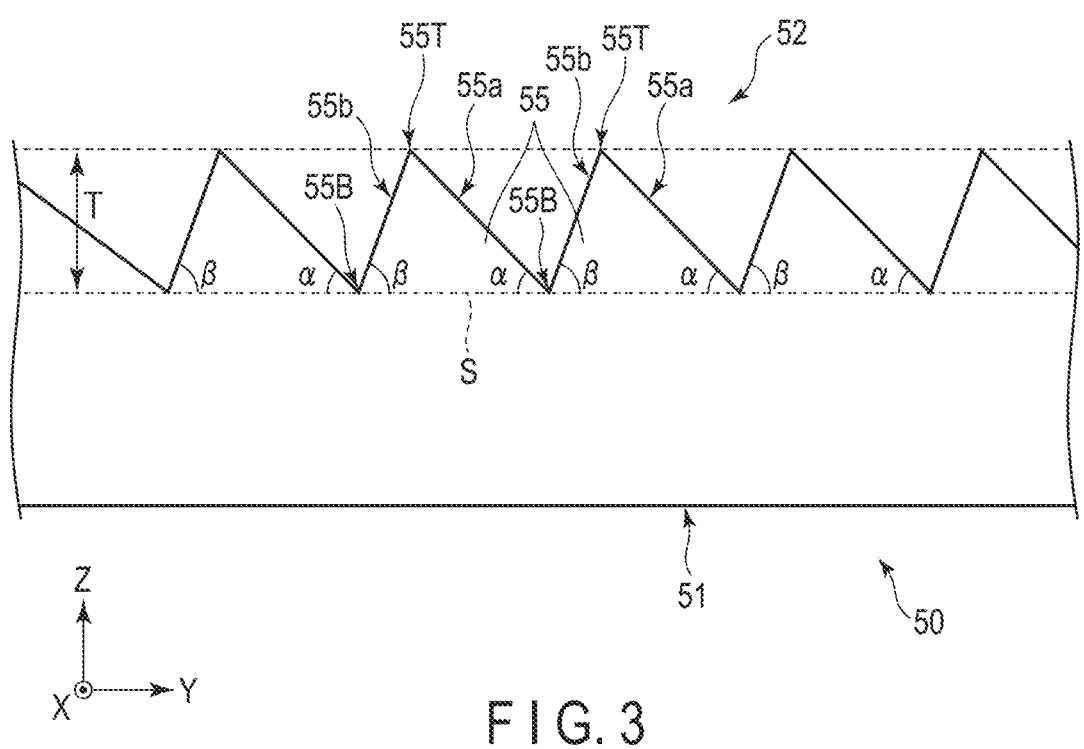
FIG. 3 is a schematic enlarged view of a prism sheet shown in FIG. 2.

FIG. 3 is a schematic enlarged view of the prism sheet 50 shown in FIG. 2. The plurality of prisms 55 are provided on a reference plane S parallel to the first surface 51. Each of the plurality of prisms 55 comprises a first prism surface 55a, a second prism surface 55b, and a top portion 55T (the top portion of the prism 55). Each of the first prism surface 55a and the second prism surface 55b extends in the first direction X. The first prism surface 55a is located on one end side (the first end portion E1 side shown in FIG. 2) along the second direction Y with respect to the top portion 55T and is inclined with respect to the reference plane S at a first angle α. The second prism surface 55b is located on the other end side (the second end portion E2 side shown in FIG. 2) along the second direction Y with respect to the top portion 55T and is inclined with respect to the reference plane S at a second angle β different from the first angle. In the example of FIG. 3, the first angle α is smaller than the second angle β(α<β). The first angle α and the second angle β are set to angles for refracting light that has entered the first surface 51 along the output axis Vo shown in FIG. 2. In the example of FIG. 3, the first angle α is, for example, 35° to 40°, and the second angle β is, for example, 70° to 75°. The first angle α and the second angle β are not limited to these examples.

In adjacent two prisms 55, the first prism surface 55a of one prism 55 and the second prism surface 55b of the other prism 55 are continuously formed.

In adjacent two prisms 55, an intersection portion between the first prism surface 55a of one prism 55 and the second prism surface 55b of the other prism 55 is referred to as a bottom portion 55B. The reference plane S is a plane formed along a plurality of bottom portions 55B.

The top portion 55T corresponds to the intersection portion between the first prism surface 55a and the second prism surface 55b of one prism 55. The top portion 55T extends in the first direction X. In the example of FIG. 3, a distance T between the reference plane S and the top portion 55T in the third direction Z (corresponding to the height of the prism 55 in the third direction Z) is common to all of the prisms 55.

FIG. 4 is a schematic plan view of the display device DSP of the first embodiment. In FIG. 4, illustration of the illumination device 30 shown in FIG. 2 is omitted.

The display panel PNL includes a display area DA and a surrounding area SA. The display area DA is an area which displays images. The display area DA includes a plurality of pixels PX arranged in a matrix in the first direction X and the second direction Y. In the examples shown in figures, the first substrate SUB1, the second substrate SUB2, and the display area DA are formed in rectangular shapes extending in the first direction X. However, the shapes of these elements are not limited to the shapes shown in figures. The surrounding area SA includes the display area DA. The surrounding area SA includes the extending portion Ex.

As shown in enlarged manner in FIG. 4, each of the plurality of pixels PX comprises a switching element SW, a pixel electrode PE, a common electrode CE, the liquid crystal layer LC, and the like. The switching element SW is constituted by, for example, a thin-film transistor (TFT) and is electrically connected to a scanning line GL and a signal line SL. The scanning line GL is electrically connected to the switching element SW in each of the pixels PX arranged in the first direction X. The signal line SL is electrically connected to the switching element SW in each of the pixels PX arranged in the second direction Y. The pixel electrode PE is electrically connected to the switching element SW. Each of the pixel electrodes PE is opposed to the common electrode CE, and drives the liquid crystal layer LC by an electric field produced between the pixel electrode PE and the common electrode CE. A capacitor CS is formed, for example, between an electrode having the same electric potential level as the common electrode CE and an electrode having the same electric potential level as the pixel electrode PE.

As an example, the scanning line GL, the signal line SL, the switching element SW, the pixel electrode PE, and the common electrode CE are provided on the first substrate SUB1. The pixel electrode PE may be provided on the first substrate SUB1. The common electrode CE may be provided on the second substrate SUB2.

The optical sheet 45, the prism sheet 50, and the adhesive 60 cover the entire display area DA in plan view. In the example of FIG. 4, each side of the optical sheet 45, the prism sheet 50, and the adhesive 60 is located in the surrounding area SA in plan view. Each of the optical sheet 45, the prism sheet 50, and the adhesive 60 may have the same size as the second substrate SUB2 in plan view. In addition, the optical sheet 45, the prism sheet 50, and the adhesive 60 may have sizes different from each other. Lateral lines in FIG. 4 indicate the plurality of prisms 55 included in the prism sheet 50.

Figure 5:
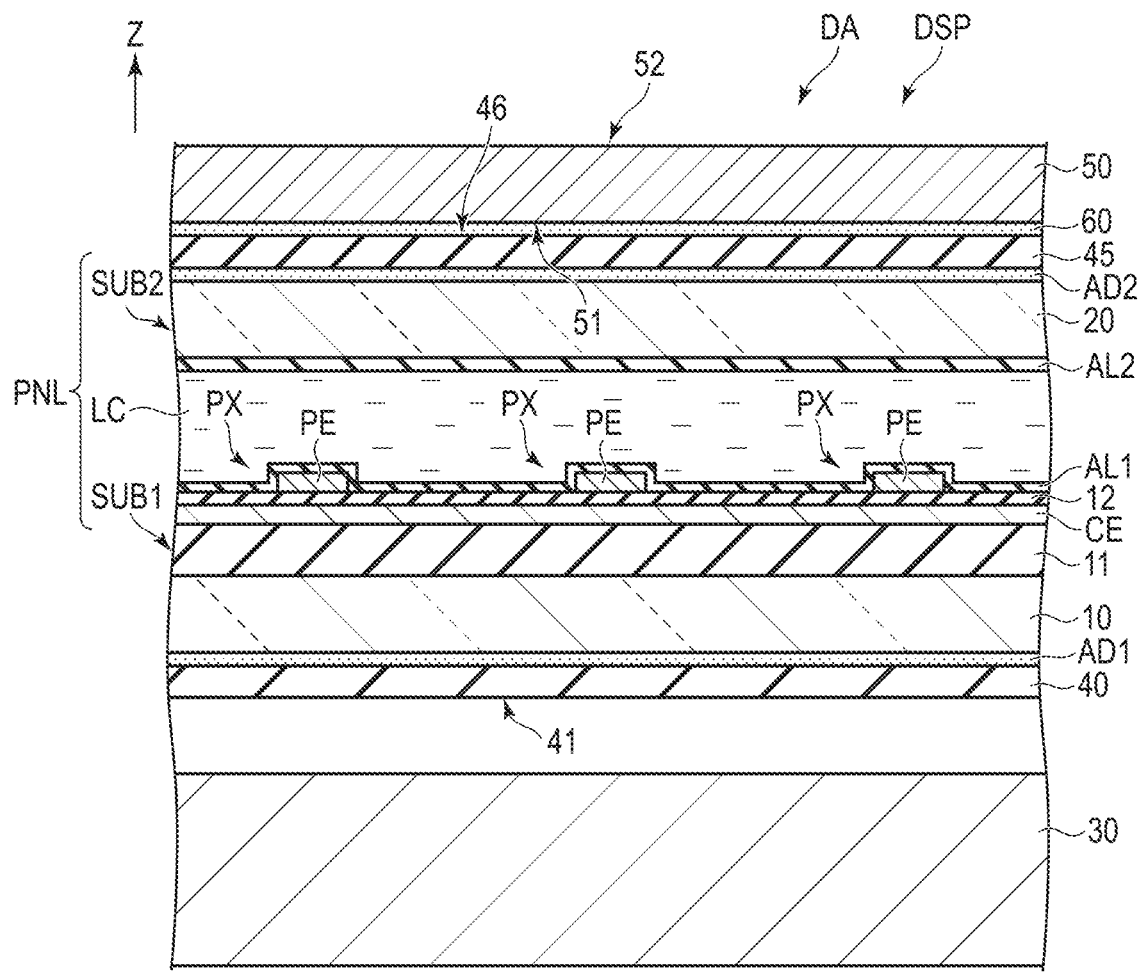
FIG. 5 is a schematic cross-sectional view of the display device in a display area.

FIG. 5 is a schematic cross-sectional view of the display device DSP in the display area DA. In FIG. 5, the illustration of the plurality of prisms 55 included in the prism sheet 50 is omitted.

The first substrate SUB1 comprises a transparent substrate 10, an insulating layer 11, an insulating layer 12, the common electrode CE, the plurality of pixel electrodes PE, and an alignment film AL1. The first substrate SUB1 is opposed to the illumination device 30 in the third direction Z. The insulating layer 11 is provided on the transparent substrate 10. The common electrode CE is provided over a plurality of pixels PX on the insulating layer 11. The insulating layer 12 is provided on the common electrode CE. The plurality of pixel electrodes PE are provided for the respective pixels PX on the insulating layer 12. The alignment film AL1 covers the plurality of pixel electrodes PE and the insulating layer 12. The scanning lines GL, the signal lines SL, and the switching elements SW shown in FIG. 4 are provided between the transparent substrate 10 and the common electrode CE.

The second substrate SUB2 comprises a transparent substrate 20 and an alignment film AL2. The second substrate SUB2 is provided above the first substrate SUB1. The alignment film AL2 is provided below the transparent substrate 20. Though not illustrated, a light-shielding layer, a color filter layer, an overcoat layer, and the like may be further provided on the second substrate SUB2. The color filter layer may be provided on the first substrate SUB1. The common electrode CE may be provided on the second substrate SUB2. The liquid crystal layer LC is held between the first alignment film AL1 and the second alignment film AL2.

The optical sheet 40 is provided between the illumination device 30 and the transparent substrate 10. The optical sheet 40 is bonded to a lower surface of the transparent substrate 10 by an adhesive AD1. The optical sheet 45 is provided between the second substrate SUB2 and the prism sheet 50. The optical sheet 45 is bonded to an upper surface of the transparent substrate 20 by an adhesive AD2. For example, OCA and OCR can be used as the adhesive AD1 and the adhesive AD2.

In the display device DSP of the first embodiment, the prism sheet 50 is bonded to the optical sheet 45 by the adhesive 60. Thus, for example, portions for holding the prism sheet 50 and the display panel PNL respectively in a state where a gap (air layer) is provided between the prism sheet 50 and the optical sheet 45 can be reduced. Therefore, the number of portions can be reduced, and thus manufacturing cost can be reduced.

In addition, the adhesive 60 covers the entire first surface 51 of the prism sheet 50. Therefore, deformation of the prism sheet 50 due to a temperature change can be suppressed even when the display device DSP is mounted on vehicles and the like involving a large temperature change. Specifically, deflection of the prism sheet 50 due to expansion of the prism sheet 50 is suppressed. Therefore, the degradation in display quality due to deformation and deflection of the prism sheet 50 can be suppressed.

In addition, the adhesive 60 overlaps with at least the entire display area DA and is interposed between the optical sheet 45 and the prism sheet 50. A refractive index difference between the prism sheet 50 and the adhesive 60 is smaller than a refractive index difference between the prism sheet 50 and air. Therefore, reflection amount of light at the boundary between the first surface 51 and the adhesive 60 is smaller than reflection amount of light on the first surface 51 in a case where the first surface 51 is in contact with the air layer. Therefore, loss of the light La, emitted from the illumination device 30, due to undesired reflection at the first surface 51 can be suppressed.

Second Embodiment

Next, a second embodiment will be described. The same elements as those of the first embodiment are denoted by the same reference numbers and overlapping descriptions of these elements are omitted.

Figure 6:
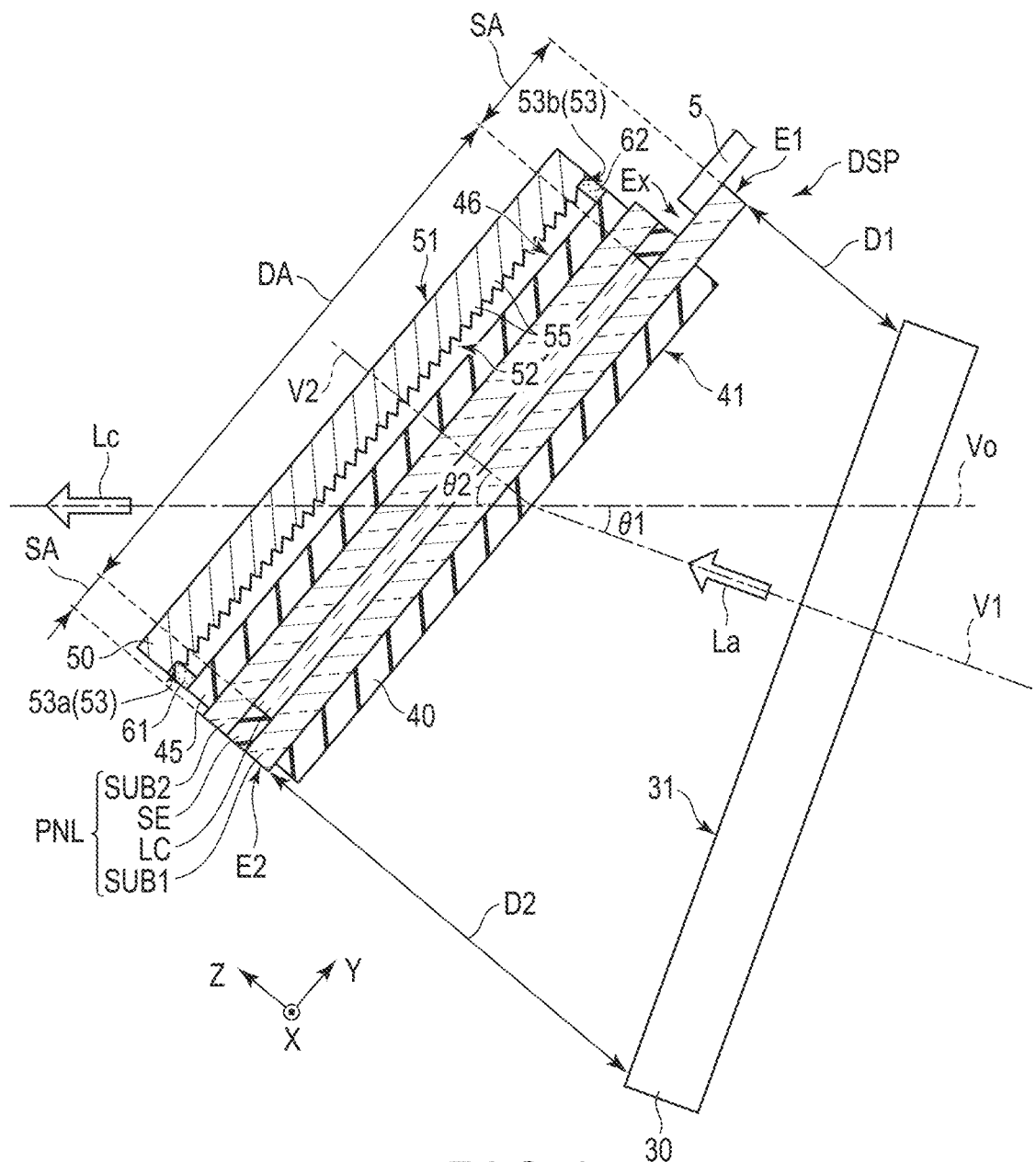
FIG. 6 is a view showing a schematic configuration example of a display device of a second embodiment.

FIG. 6 is a view showing a schematic configuration example of a display device DSP of a second embodiment. The display device DSP of the second embodiment comprises adhesives 61 and 62 located in a surrounding area SA, instead of the adhesive 60 shown in FIG. 2. The adhesives 61 and 62 are, for example, double-sided tapes.

A second surface 52 of a prism sheet 50 is opposed to an upper surface 46 of an optical sheet 45 in the third direction Z. Each top portion 55T of a plurality of prisms 55 is spaced apart from the upper surface 46. That is, an air layer is interposed between the optical sheet 45 and the prism sheet 50. The adhesives 61 and 62 bond the upper surface 46 of the optical sheet 45 and the second surface 52 together.

The second surface 52 includes a flat portion 53 parallel to a first surface 51 outside the plurality of prisms 55. The plurality of prisms 55 are not formed on the flat portion 53. In the example shown in FIG. 6, the flat portion 53 includes a first flat portion 53a and a second flat portion 53b. The second flat portion 53b is located on a side opposite to the first flat portion 53a with the plurality of prisms 55 interposed therebetween. The plurality of prisms 55 overlap with a liquid crystal layer LC in a display area DA. The first flat portion 53a and the second flat portion 53b overlap with a seal SE in the surrounding area SA. In the example of FIG. 6, the second flat portion 53b is located on an extending portion Ex side. Each of the adhesive 61 and the adhesive 62 bonds the upper surface 46 of the optical sheet 45 and the flat portion 53 together. More specifically, the adhesive 61 bonds the upper surface 46 and the first flat portion 53a together, and the adhesive 62 bonds the upper surface 46 and the second flat portion 53b together. The adhesive 61 and the adhesive 62 overlap with the seal SE.

Light that has been emitted from an illumination device 30 and has passed through an optical sheet 40, a display panel PNL, and the optical sheet 45, enters the second surface 52 of the prism sheet 50. The light that has entered the second surface 52 is refracted by the plurality of prisms 55 and is emitted from the first surface 51 as light Lc along an output axis Vo.

Figure 7:
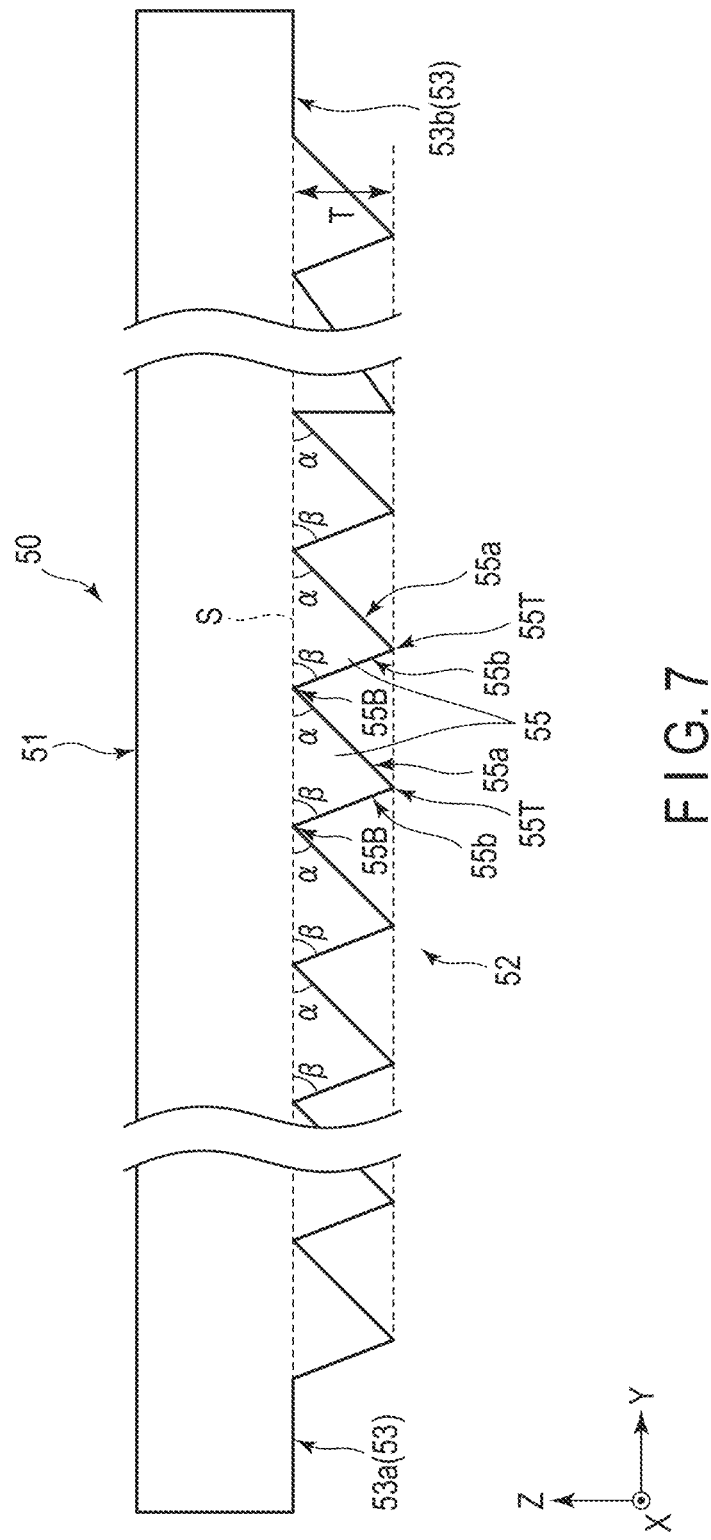
FIG. 7 is a schematic enlarged view of a prism sheet shown in FIG. 6.

FIG. 7 is a schematic enlarged view of the prism sheet 50 shown in FIG. 6. In the example of FIG. 7, each of the first flat portion 53a and the second flat portion 53b is located on the same plane as a reference plane S. Each of the first flat portion 53a and the second flat portion 53b may not be located on the same plane as the reference plane S. In addition, positions of the first flat portion 53a and the second flat portion 53b in the third direction Z may be different from each other.

Figure 8:
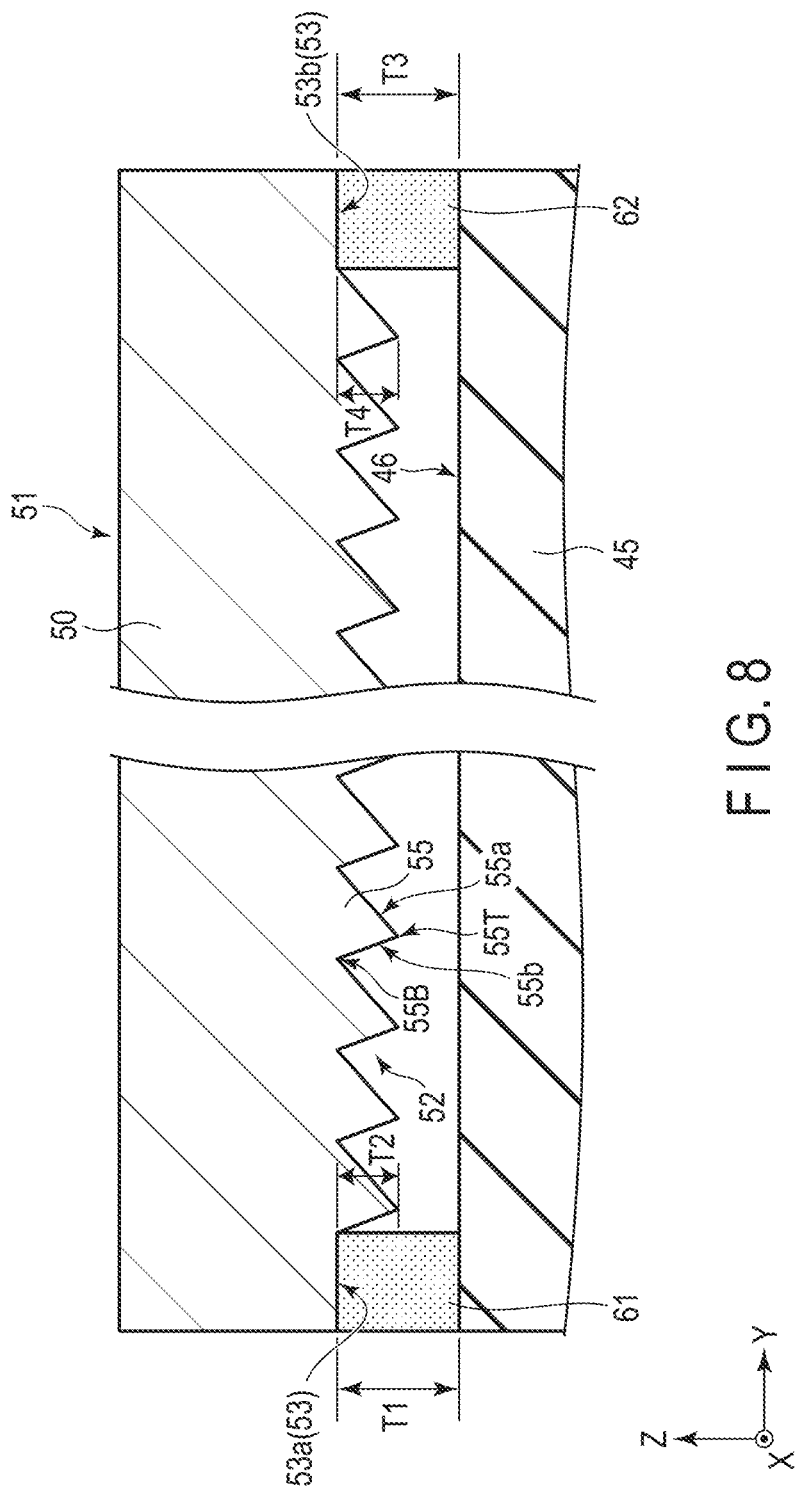
FIG. 8 is a schematic enlarged view of an adhesive shown in FIG. 6.

FIG. 8 is a schematic enlarged view of the adhesive 61 and the adhesive 62 shown in FIG. 6. A thickness T1 of the adhesive 61 is greater than a distance T2 in the thickness direction (third direction Z) of the prism sheet 50 between the first flat portion 53a and the top portion 55T of the prism sheet 55. In addition, a thickness T3 of the adhesive 62 is greater than a distance T4 in the thickness direction (third direction Z) of the prism sheet 50 between the second flat portion 53b and the top portion 55T. Therefore, the top portion 55T of the prism 55 is spaced apart from the upper surface 46 of the optical sheet 45.

Figure 9:
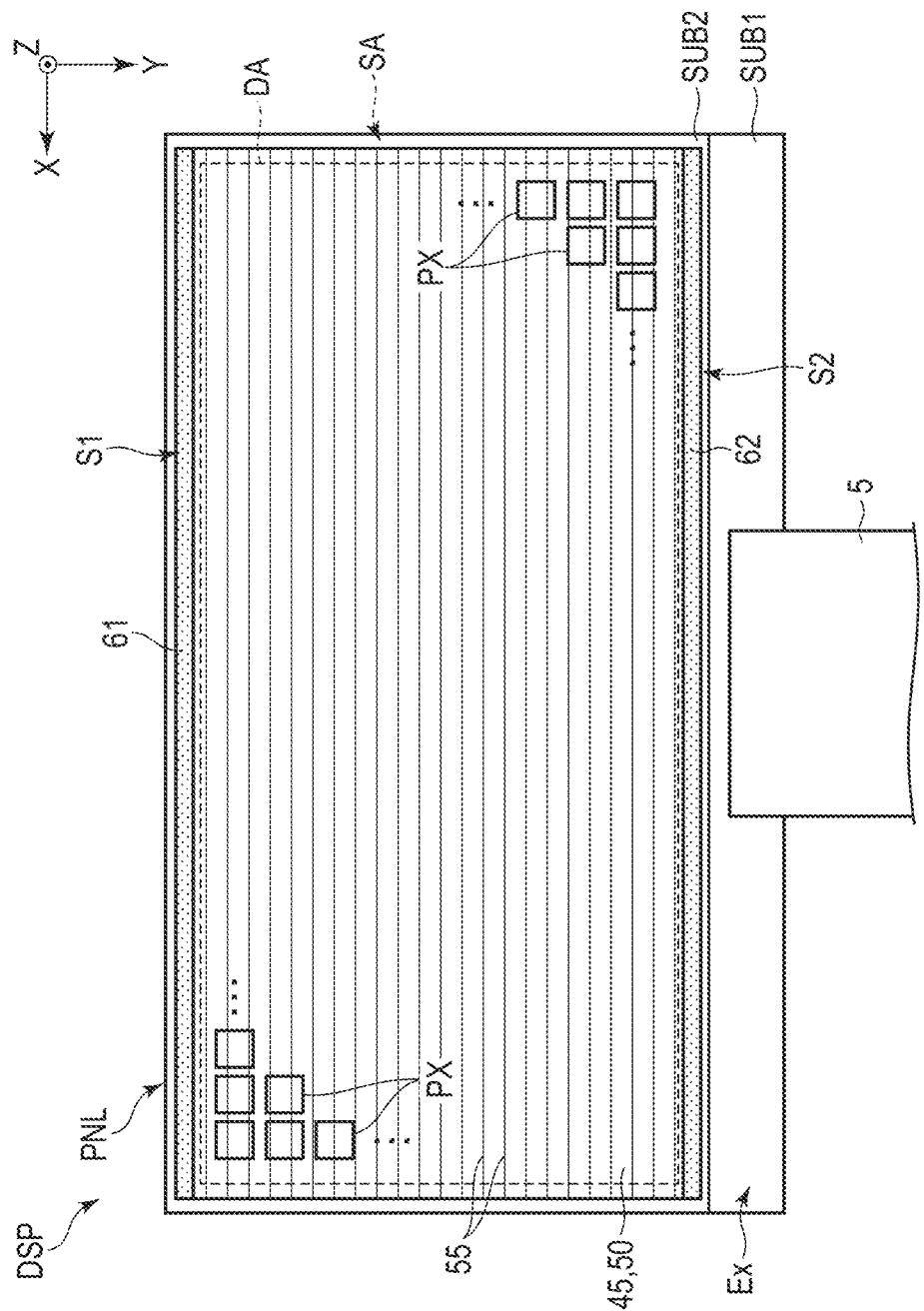
FIG. 9 is a schematic plan view of the display device of the second embodiment.

FIG. 9 is a schematic plan view of the display device DSP of the second embodiment.

The prism sheet 50 includes a first side S1 extending along the first direction X and a second side S2 extending in the first direction X and provided on a side opposite to the first side S1 with the display area DA interposed therebetween. The first side S1 and the second side S2 correspond to longer sides of the prism sheet 50, respectively. As shown in the dotted pattern in FIG. 9, the adhesive 61 and the adhesive 62 are provided in the surrounding area SA. In the example of FIG. 9, the adhesive 61 is provided between the first side S1 and the display area DA, and the adhesive 62 is provided between the second side S2 and the display area DA. The adhesive 61 is provided along the first side S1, and the adhesive 62 is provided along the second side S2. In addition, the adhesive 61 overlaps with the first side S1 in plan view, and the adhesive 62 overlaps with the second side S2 in plan view.

As shown in lateral lines in FIG. 9, the plurality of prisms 55 extend along the first direction X. In other words, the extension direction of the plurality of prisms 55 is parallel to the extension direction of each of the first side S1 and the second side S2. The plurality of prisms 55 may extend along the second direction Y. In other words, the extension direction of the plurality of prisms 55 may intersect the extension direction of each of the first side S1 and the second side S2.

Figure 10:
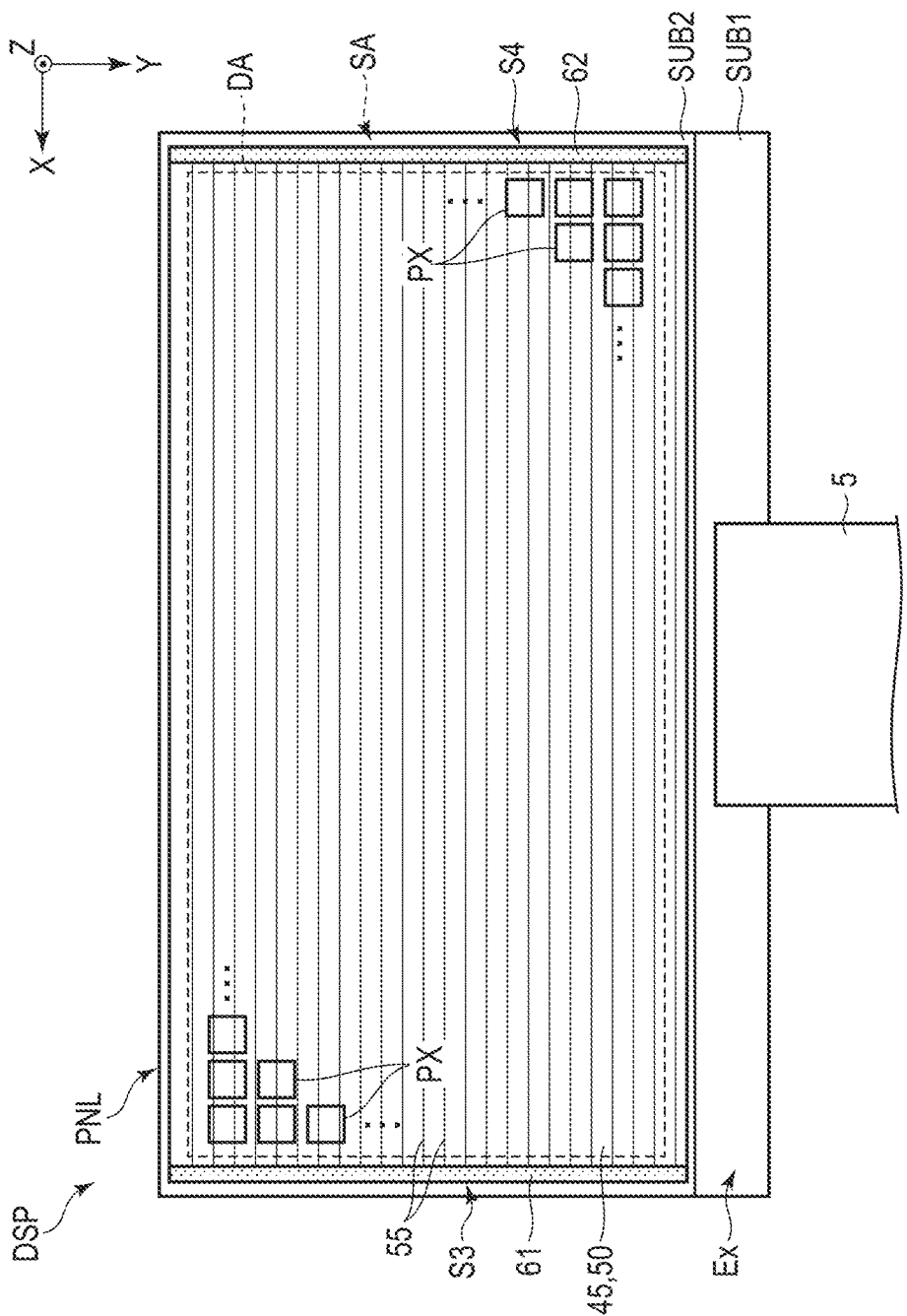
FIG. 10 is a schematic plan view showing another example of the display device of the second embodiment.

FIG. 10 is a schematic plan view showing another example of the display device of the second embodiment.

The prism sheet 50 includes a third side S3 extending along the second direction Y and a fourth side S4 extending in the second direction Y and provided on a side opposite to the third side S3 with the display area DA interposed therebetween. The third side S3 and the fourth side S4 correspond to shorter sides of the prism sheet 50, respectively. In the example of FIG. 10, the adhesive 61 is provided between the third side S3 and the display area DA, and the adhesive 62 is provided between the fourth side S4 and the display area DA. In addition, the adhesive 61 overlaps with the third side S3 in plan view, and the adhesive 62 overlaps with the fourth side S4 in plan view.

As shown in lateral lines in FIG. 10, the plurality of prisms 55 extend along the first direction X. In other words, the extension direction of the plurality of prisms 55 may intersect (be orthogonal to) the extension direction of each of the third side S3 and the fourth side S4. The plurality of prisms 55 may extend along the second direction Y. In other words, the extension direction of the plurality of prisms 55 is parallel to the extension direction of each of the third side S3 and the fourth side S4.

Similarly to the display device DSP of the first embodiment, the display device DSP of the second embodiment can reduce portions for holding the prism sheet 50 and the display panel PNL respectively to provide a gap between the prism sheet 50 and the optical sheet 45. Thus, the manufacturing cost can be reduced.

In addition, the prism sheet 50 is provided in a state where the top portion 55T of the prism sheet 50 is spaced apart from the upper surface 46 of the optical sheet 45. The prism sheet 50 is bonded to the optical sheet 45 at opposed two sides. Therefore, the deflection of the prism sheet 50 can be suppressed, and thus the occurrence of the non-uniformity in display due to the prism sheet 50 partially contacting the optical sheet 45 can be suppressed.

In addition, as shown in FIG. 9, the adhesive 61 and the adhesive 62 are provided along the first side S1 and the second side S2 that correspond to longer sides of the prism sheet 50, respectively. When the prism sheet 50 expands isotropically, the deformation amount in the shorter sides (second direction Y) is smaller than the deformation amount in the longer sides (first direction X) in the prism sheet 50. Therefore, arranging the adhesive along the longer sides (the first side S1 and the second side S2) opposed to each other in the second direction Y can suppress the deflection of the prism sheet 50 more than arranging the adhesive along the shorter sides opposed to each other in the first direction X.

In addition, as shown in FIG. 10, the adhesive 61 and the adhesive 62 are provided to intersect the extension direction of the prism 55. The prism sheet 50 tends to be deflected at a bottom portion 55B of adjacent prisms 55. Thus, arranging adhesive to intersect the extension direction of the prism 55 can suppress the deflection of the prism sheet 50 more than arranging adhesive to be parallel to the extension direction of the prism 55.

Figure 11:
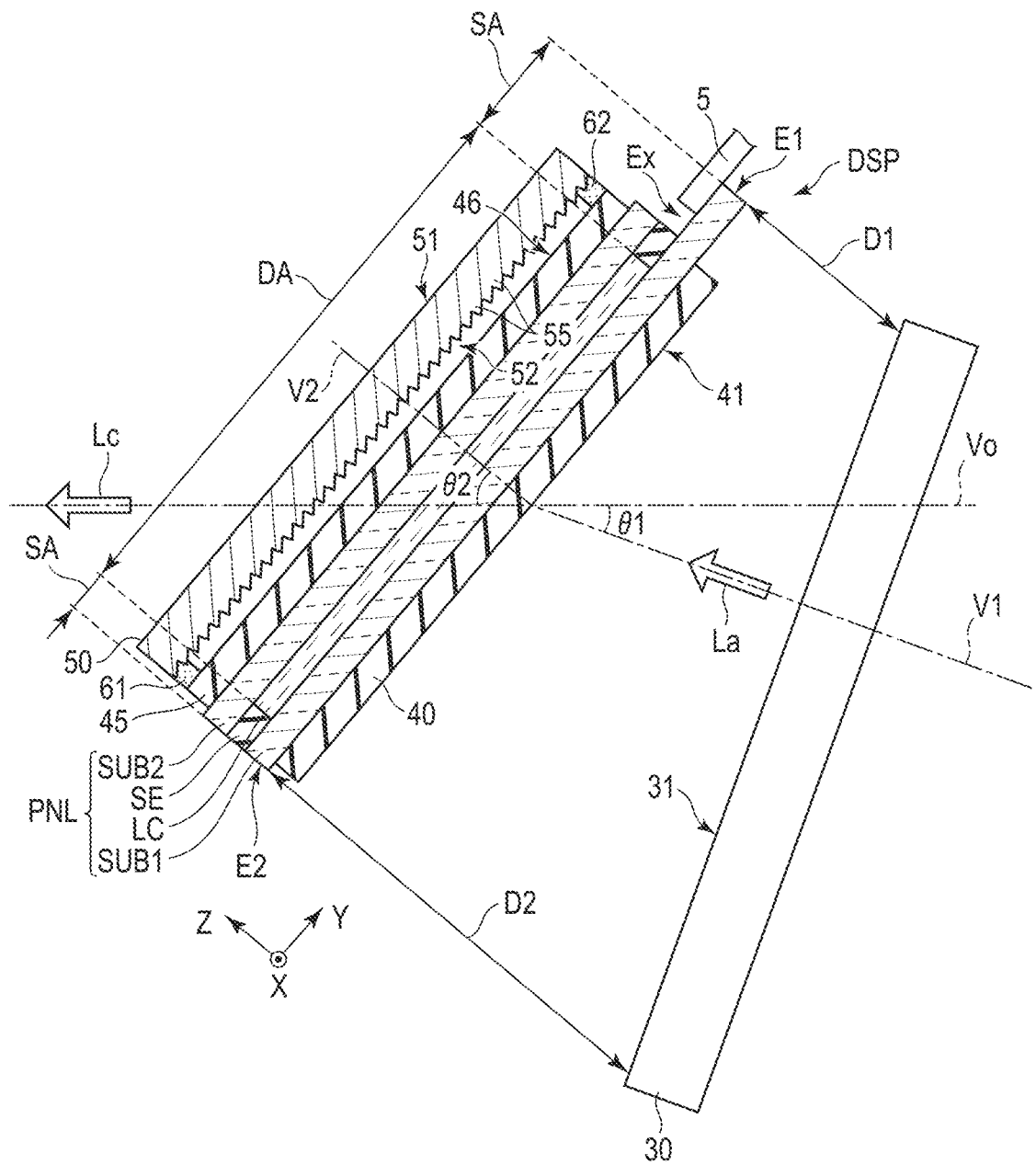
FIG. 11 is a view showing yet another schematic configuration example of the display device of the second embodiment.

FIG. 11 is a yet another configuration example of the display device DSP of the second embodiment. The prism sheet 50, included in the display device DSP shown in FIG. 11, does not include the flat portion 53 shown in FIG. 6. Each of the adhesive 61 and the adhesive 62 bonds the upper surface 46 of the optical sheet 45 and the plurality of prisms 55 together.

The adhesive 61 and the adhesive 62 shown in FIG. 6 are bonded to the flat portion 53 of the prism sheet 50. In contrast, the adhesive 61 and the adhesive 62 shown in FIG. 11 are bonded to the plurality of prisms 55 of the prism sheet 50. Therefore, when the adhesive 61 and the adhesive 62 have the same width in the second direction Y in each of FIG. 6 and FIG. 11, contact areas of the adhesive 61 and the adhesive 62 of the prism sheet 50 shown in FIG. 11 are greater than contact areas of the adhesive 61 and the adhesive 62 of the prism sheet 55 shown in FIG. 6. Therefore, adhesive strength of the prism sheet 50 and the optical sheet 45 can be increased.

All of the display devices that can be implemented by a person of ordinary skill in the art through arbitrary design changes to the display device described above as the embodiment of the present invention come within the scope of the present invention as long as they are in keeping with the spirit of the present invention.

Various types of the modified examples are easily conceivable within the category of the ideas of the present invention by a person of ordinary skill in the art and the modified examples are also considered to fall within the scope of the present invention. For example, additions, deletions or changes in design of the constituent elements or additions, omissions, or changes in condition of the processes arbitrarily conducted by a person of ordinary skill in the art, in the above embodiments, fall within the scope of the present invention as long as they are in keeping with the spirit of the present invention.

In addition, the other advantages of the aspects described in the embodiments, which are obvious from the descriptions of the present specification or which can be arbitrarily conceived by a person of ordinary skill in the art, are considered to be achievable by the present invention as a matter of course.

What is claimed is:

1. A display device, comprising:
    an illumination device;
    a display panel including a first substrate opposed to the illumination device, a second substrate opposed to the first substrate, and a liquid crystal layer provided between the first substrate and the second substrate;
    an optical sheet bonded to the second substrate;
    a prism sheet including a first surface, which is a flat surface opposed to an upper surface of the optical sheet, and a second surface, which includes a plurality of prisms provided in parallel with each other and is located on a side opposite to the first surface; and
    an adhesive bonding the upper surface of the optical sheet and the first surface together, wherein
    the illumination device includes an emission surface inclined with respect to the first substrate,
    the first substrate includes a first end portion and a second end portion on a side opposite to the first end portion in a direction in which the plurality of prisms are arranged, and
    an interval between the first substrate and the illumination device on the first end portion side is smaller than an interval between the first substrate and the illumination device on the second end portion side.

2. The display device of claim 1, wherein
    each of the plurality of prisms includes a first prism surface located on the first end portion side with respect to a top portion of the prism and a second prism surface located on the second end portion side with respect to the top portion of the prism,
    the first prism surface is inclined with respect to a reference plane parallel to the first surface at a first angle, and
    the second prism surface is inclined with respect to the reference plane at a second angle greater than the first angle.

3. A display device, comprising:
    an illumination device;
    a display panel including a first substrate opposed to the illumination device, a second substrate opposed to the first substrate, a liquid crystal layer provided between the first substrate and the second substrate, a display area displaying an image, and a surrounding area surrounding the display area;
    an optical sheet bonded to the second substrate;
    a prism sheet including a first surface, which is a flat surface, and a second surface, which is located on a side opposite to the first surface, is opposed to an upper surface of the optical sheet, and includes a plurality of prisms provided in parallel with each other; and
    an adhesive bonding the upper surface of the optical sheet and the second surface together in the surrounding area, wherein
    a top portion of the prism is spaced apart from the upper surface of the optical sheet.

4. The display device of claim 3, wherein
    the display panel further includes a seal sealing the liquid crystal layer, and
    the adhesive overlaps with the seal.

5. The display device of claim 3, wherein
    the second surface further includes a flat portion on which the plurality of prisms are not formed, and
    the adhesive bonds the upper surface and the flat portion together.

6. The display device of claim 5, wherein
the flat portion includes a first flat portion and a second flat portion located on a side opposite to the first flat portion with the plurality of prisms interposed therebetween in plan view, and
the adhesive bonds the upper surface and the first flat portion together and the upper surface and the second flat portion together.

7. The display device of claim 5, wherein
a thickness of the adhesive is greater than a distance in a thickness direction of the prism sheet between the flat portion and the top portion of the prism.

8. The display device of claim 3, wherein
the adhesive bonds the upper surface and the plurality of prisms together.

9. The display device of claim 3, wherein
the prism sheet includes a first side and a second side located on a side opposite to the first side with the display area interposed therebetween, and
the adhesive is provided along the first side and the second side.

10. The display device of claim 9, wherein
the first side and the second side correspond to longer sides of the prism sheet, respectively.

11. The display device of claim 9, wherein
the first side and the second side correspond to shorter sides of the prism sheet, respectively.

12. The display device of claim 9, wherein
an extending direction of the plurality of prisms is parallel to an extending direction of each of the first side and the second side.

13. The display device of claim 9, wherein
an extending direction of the plurality of prisms intersects an extending direction of each of the first side and the second side.

14. The display device of claim 3, wherein
the illumination device includes an emission surface inclined with respect to the first substrate,
the first substrate includes a first end portion and a second end portion on a side opposite to the first end portion in a direction in which the plurality of prisms are arranged, and
an interval between the first substrate and the illumination device on the first end portion side is smaller than an interval between the first substrate and the illumination device on the second end portion side.

15. The display device of claim 14, wherein
each of the plurality of prisms includes a first prism surface located on the first end portion side with respect to the top portion of the prism and a second prism surface located on the second end portion side with respect to the top portion of the prism,
the first prism surface is inclined with respect to a reference plane parallel to the first surface at a first angle, and
the second prism surface is inclined with respect to the reference plane at a second angle greater than the first angle.

* * * * *